US009939860B2

(12) United States Patent
Zhang

(10) Patent No.: US 9,939,860 B2
(45) Date of Patent: Apr. 10, 2018

(54) ELECTRONIC DEVICE, FIRST AND SECOND ELECTRONIC DEVICE THEREOF, AND METHOD FOR SWITCHING FIRST ELECTRONIC DEVICE

(71) Applicants: Beijing Lenovo Software Ltd, Beijing (CN); Lenovo (Beijing) Co., Ltd., Beijing (CN)

(72) Inventor: Guowen Zhang, Beijing (CN)

(73) Assignees: Beijing Lenovo Software Ltd., Beijing (CN); Lenovo (Beijing) Co. Ltd., Beijing (CN)

( * ) Notice: Subject to any disclaimer, the term of this patent is extended or adjusted under 35 U.S.C. 154(b) by 274 days.

(21) Appl. No.: 13/944,452

(22) Filed: Jul. 17, 2013

(65) Prior Publication Data

US 2014/0028115 A1 Jan. 30, 2014

(30) Foreign Application Priority Data

Jul. 24, 2012 (CN) .......................... 2012 1 0258666

(51) Int. Cl.
*G06F 1/20* (2006.01)
*H02J 4/00* (2006.01)

(52) U.S. Cl.
CPC .............. *G06F 1/206* (2013.01); *G06F 1/203* (2013.01); *H02J 4/00* (2013.01); *Y10T 307/826* (2015.04)

(58) Field of Classification Search
CPC . G06F 1/20; G06F 1/203; G06F 1/206; G06F 1/1632; G06F 13/409; H04N 2201/0058; H02J 4/00; Y10T 307/826; H04M 1/72527

USPC .......... 307/125, 679.47; 361/679.47, 679.41; 710/303, 304; D14/434
See application file for complete search history.

(56) References Cited

U.S. PATENT DOCUMENTS

| | | | | |
|---|---|---|---|---|
| 5,457,342 A | * | 10/1995 | Herbst, II | ...................... 257/712 |
| 6,880,346 B1 | * | 4/2005 | Tseng | ...................... F25B 21/02 |
| | | | | 257/E23.082 |
| 7,165,601 B1 | * | 1/2007 | Hashimoto | ............... G06F 1/20 |
| | | | | 165/185 |
| 2002/0181201 A1 | * | 12/2002 | Liu | ....................... G06F 1/1632 |
| | | | | 361/679.49 |
| 2004/0123604 A1 | * | 7/2004 | Pokharna | ................ G06F 1/203 |
| | | | | 62/3.2 |

(Continued)

*Primary Examiner* — Jayprakash N Gandhi
*Assistant Examiner* — Stephen Sul
(74) *Attorney, Agent, or Firm* — Harness, Dickey & Pierce, P.L.C.

(57) ABSTRACT

An electronic device according to the invention includes a second electronic device and a first electronic device removably connected with the second electronic device; the electronic device includes a first heat dissipation channel in the first electronic device and a second heat dissipation channel in the second electronic device. In a disconnected state, the heat dissipation airflow flows through the first heat dissipation channel to perform heat dissipation of the first electronic device. In a connected state, the first air inlet of the first heat dissipation channel communicates with the second air outlet of the second heat dissipation channel, and the heat dissipation airflow may enter into the first heat dissipation channel via the second heat dissipation channel so as to perform heat dissipation of the first electronic device by the second heat dissipation channel and the first heat dissipation channel.

18 Claims, 4 Drawing Sheets

(56) References Cited

U.S. PATENT DOCUMENTS

| | | | |
|---|---|---|---|
| 2006/0126289 A1* | 6/2006 | Takenoshita | G06F 1/203 361/679.47 |
| 2007/0035917 A1* | 2/2007 | Hotelling | G06F 1/1632 361/679.56 |
| 2007/0091560 A1* | 4/2007 | Parker | G06F 1/1632 361/679.48 |
| 2008/0030955 A1* | 2/2008 | Chen | G06F 1/203 361/700 |
| 2010/0195280 A1* | 8/2010 | Huang | F28D 15/0266 361/679.47 |
| 2010/0259886 A1* | 10/2010 | Mongia | G06F 1/1632 361/679.47 |
| 2011/0267769 A1* | 11/2011 | Nakamura | G06F 1/203 361/679.48 |
| 2012/0160456 A1* | 6/2012 | Aoki | 165/104.26 |
| 2013/0095925 A1* | 4/2013 | Xu | G06F 1/1626 463/37 |

* cited by examiner

ELECTRONIC DEVICE, FIRST AND SECOND ELECTRONIC DEVICE THEREOF, AND METHOD FOR SWITCHING FIRST ELECTRONIC DEVICE

The present application claims the priority of Chinese Patent Application No. 201210258666.8, titled "ELECTRONIC DEVICE, FIRST AND SECOND ELECTRONIC DEVICE THEREOF, AND METHOD FOR SWITCHING FIRST ELECTRONIC DEVICE", filed with the Chinese State Intellectual Property Office on Jul. 24, 2012, the entire disclosure of which are incorporated herein by reference.

FIELD OF THE INVENTION

The invention relates to the field of an electronic device, and particularly to an electronic device, a first and a second electronic device thereof, and a method for switching the use state of the first electronic device.

BACKGROUND OF THE INVENTION

With the rapid development of the electronic information technology, the tablet computer (pad) becomes more and more popular for its advantages such as portability and digital control. However, for the user needing to transcribe notes, the handwriting speed of the pad is relatively slow compared with the typing speed up to 30 to 60 words per minute, so the pad without a keyboard can not completely replace the conventional notebook computer. Therefore, a notebook computer having two system use states which is evolved from a normal notebook computer is developed, that is, a pad which can operate independently is inserted into a base with a built-in hardware system, which becomes a notebook computer having a full-functional keyboard, and the current pad is equivalent to a screen of the notebook computer. The user can perform a seamless switching on the operating system by utilizing the "double-mode switching" function of the notebook computer having two use states, to support continuous network experience.

Based on the above, the system provider develops another notebook computer having two use states. The main system of the notebook computer is provided on the display portion, and its base is only provided with a battery, a keyboard and other simple external interface. The display portion of the notebook computer can be separately used as a pad when removing from the base; and when the display portion of the notebook computer is inserted into the base, it can be used as a normal notebook computer. The same hardware system is used under the two different use states. In designing of the notebook computer, either of the lightweight and thinning as a separate pad or the high performance as a normal notebook computer needs to be considered. Therefore, how to perform heat dissipation on the system becomes a difficult and urgent problem.

In view of this, it is urgent to improve the existing heat dissipation technology for an electronic device having two use states, so as to solve the problem of low heat dissipation efficiency of the existing heat dissipation system and extend life span of the electronic device.

SUMMARY OF THE INVENTION

In view of the above defects, an object of the invention is to provide an electronic device designed for optimizing the existing heat dissipation technology to improve the heat dissipation effect. Based on this, a first electronic device and a second electronic device of the electronic device and a method for switching use state of the first electronic device are provided according to the present invention.

A first electronic device is provided according to the invention, including:

a first case, on which a first interface is provided, the first interface is adapted to removably connected with a second interface of a second electronic device; and a processing unit, provided in the first case, where a first air inlet is provided on a side of the first case connecting with the second electronic device, and a first heat dissipation channel of the first electronic device is formed with the first air inlet as an upstream end, and where in a case that the first interface is connected with the second interface, the first air inlet communicates with a second air outlet of a second heat dissipation channel of the second electronic device.

Preferably, the second heat dissipation channel outputs a heat dissipation airflow with a heat dissipation parameter of the first air inlet improved.

Preferably, a first radiator is provided in the first heat dissipation channel.

Preferably, the first radiator is a heat pipe radiator comprising: a heat conducting plate whose bottom surface is connected with a top surface of an interior heating element, a first heat pipe, a first heat dissipation fin and a first fan arranged oppositely to the first heat dissipation fin, where an evaporation end of the first heat pipe is connected with the heat conducting plate, and a condensation end of the first heat pipe is connected with the first heat dissipation fin.

Preferably, a first air outlet at a downstream end of the first heat dissipation channel is provided on the first case; and the first radiator further comprises a heat pipe radiator case, the first heat dissipation fin and the first fan are arranged in the heat pipe radiator case in parallel, an air inlet of the heat pipe radiator case communicates with the first air inlet of the first case, and an air outlet of the heat pipe radiator case communicates with the first air outlet of the first case.

Preferably, the first air inlet of the first case is integrated into the first interface.

Preferably, the first electronic devices further includes:

a first detection unit, adapted to detect the connection state between the first electronic device and the second electronic device;

where the processing unit is adapted to generate a switching instruction according to the connection state so as to switch the first electronic device from a first operation state to a second operation state;

where the first electronic device in the first operation state operates in a state of first power consumption, the first electronic device in the second operation state operates in a state of second power consumption, and the second power consumption is greater than the first power consumption.

Preferably, the first electronic device further includes:

a second detection unit, adapted to detect a high power consumption parameter of the first electronic device, where the processing unit is further adapted to generate a second heat dissipation instruction according to the high power consumption parameter so as to start a second radiator in the second heat dissipation channel.

A second electronic device is provided according to the invention, including:

a second case, on which a second interface is provided, the second interface is adapted to removably connected with a first interface of a first electronic device, where a second air outlet is provided on a side of the second case connecting with the first electronic device, a second heat dissipation channel of the second electronic device is formed with the second air outlet as a downstream end, and where in a case that the second interface is connected with the first interface, the second air outlet communicates with a first air inlet of a first heat dissipation channel of the first electronic device.

Preferably, a second radiator is provided in the second heat dissipation channel.

Preferably, the second radiator is adapted to cause the second heat dissipation channel to output a heat dissipation airflow with a heat dissipation parameter of the first air inlet improved.

Preferably, the second radiator is adapted to cause the second heat dissipation channel to output a heat dissipation airflow with temperature of the first air inlet decreased and/or with flow speed of the first air inlet increased.

Preferably, the second air outlet of the second case is integrated into the second interface.

An electronic device is provided according to the invention, including a second electronic device and a first electronic device removably connected with the second electronic device; the electronic device includes:

a first heat dissipation channel provided in the first electronic device; and a second heat dissipation channel provided in the second electronic device;

where in a case that the first electronic device is not connected with the second electronic device, a heat dissipation airflow passes through the first heat dissipation channel such that heat dissipation of the first electronic device is performed; and in a case that the first electronic device is connected with the second electronic device, a first air inlet of the first heat dissipation channel communicates with a second air outlet of the second heat dissipation channel, a heat dissipation airflow enters into the first heat dissipation channel via the second heat dissipation channel such that heat dissipation of the first electronic device is performed by the second heat dissipation channel and the first heat dissipation channel.

Preferably, a first radiator is provided in the first heat dissipation channel.

Preferably, a second radiator is provided in the second heat dissipation channel.

Preferably, the second radiator is adapted to cause the second heat dissipation channel to output a heat dissipation airflow with a heat dissipation parameter of the first air inlet improved.

Preferably, the second radiator is adapted to cause the second heat dissipation channel to output a heat dissipation airflow with temperature of the first air inlet decreased and/or with flow speed of the first air inlet increased.

Preferably, a processing unit of the first electronic device is adapted to generate a second heat dissipation instruction according to a high power consumption parameter of the first electronic device so as to start a fan of the second radiator.

Preferably, the first radiator is a heat pipe radiator including: a heat conducting plate whose bottom surface is connected with a top surface of an interior heating element, a first heat pipe, a first heat dissipation fin and a first fan arranged oppositely to the first heat dissipation fin, where an evaporation end of the first heat pipe is connected with the heat conducting plate, and a condensation end of the first heat pipe is connected with the first heat dissipation fin.

Preferably, the second radiator is a semiconductor radiator including:

a semiconductor refrigerator, which has a cold surface, a hot surface and a refrigerating element disposed between the cold surface and the hot surface;

two second heat pipes, which are respectively a first pipe and a second pipe, where a condensation end of the first pipe is connected with the cold surface of the semiconductor refrigerator, an evaporation end of the second pipe is connected with the hot surface of the semiconductor refrigerator, and through flow directions of the first pipe and the second pipe are interlaced in a projection plane parallel to the cold surface and the hot surface;

two second heat dissipation fins, which are respectively a first fin and a second fin, and are respectively arranged oppositely to the first pipe and the second pipe, where the first fin is connected with an evaporation end of the first pipe and the second fin is connected with a condensation end of the second pipe; and a second fan arranged oppositely to the two second heat dissipation fins.

Preferably, the electronic device further includes:

a semiconductor radiator case, where the two second heat pipes, the two second heat dissipation fins and the second fan of the semiconductor radiator are provided in the semiconductor radiator case, and an air inlet and two air outlets are provided on a top plate of the semiconductor radiator case;

where the second fan is provided at the air inlet, the first fin and the second fin are respectively provided at the two air outlets, and the air outlet on the semiconductor radiator case corresponding to the first fin communicates with the second air outlet of the second case.

A method for switching use state of a first electronic device is provided according to the invention, the first electronic device is removably connected with a second electronic device, where a first air inlet is provided on a side of the first electronic device connecting with the second electronic device, and a first heat dissipation channel of the first electronic device is formed with the first air inlet as an upstream end, and where in a case that the first interface is connected with the second interface, the first air inlet communicates with a second air outlet of a second heat dissipation channel of the second electronic device; the method for switching the use state includes:

detecting whether the first electronic device is connected with the second electronic device and acquiring a detection result;

generating a switching instruction if the detection result indicates that the first electronic device is connected with the second electronic device;

switching the first electronic device from a first operation state to a second operation state according to the switching instruction;

where the first electronic device in the first operation state operates in a state of first power consumption, the first electronic device in the second operation state operates in a state of second power consumption, and the second power consumption is greater than the first power consumption.

Preferably, the method further includes: detecting a high power consumption parameter of the first electronic device, and outputting a second heat dissipation instruction if the high power consumption parameter reaches a preset threshold, so as to start a second radiator in the second heat dissipation channel.

Compared with the existing technology, the structure of the first electronic device removably connected with the second electronic device is optimized in the invention. In the solution, a first air inlet is provided on the side of the first case connecting with the second electronic device. On one hand, a first heat dissipation channel is formed with the first air inlet as a upstream end for the first electronic device; on the other hand, in a case that the first electronic device is connected with the second electronic device, the first air inlet may communicate with the second air outlet of the second heat dissipation channel of the second electronic device. That is, the heat dissipation of the first electronic device may be performed based on the first heat dissipation channel disposed within the first electronic device, or may be performed by the second heat dissipation channel in the second electronic device. According to the above configuration, in a case that the first electronic device operates in a maximum power consumption state, the heat dissipation can be performed by the first heat dissipation channel and the second heat dissipation channel. Therefore, the heat dissipation effect of the first electronic device is greatly improved.

Furthermore, the structure of the second electronic device removably connected with the first electronic device is optimized in the invention. Preferably, a second radiator is provided in the second heat dissipation channel such that the second heat dissipation channel outputs a heat dissipation airflow with the heat dissipation parameter of the first air inlet improved. Particularly, the heat dissipation performance may be improved by changing the temperature and/or the flow speed.

The first electronic device according to the invention is applicable to any electronic product removably connected with the second electronic device, especially applicable to the tablet computer.

Figure 1:
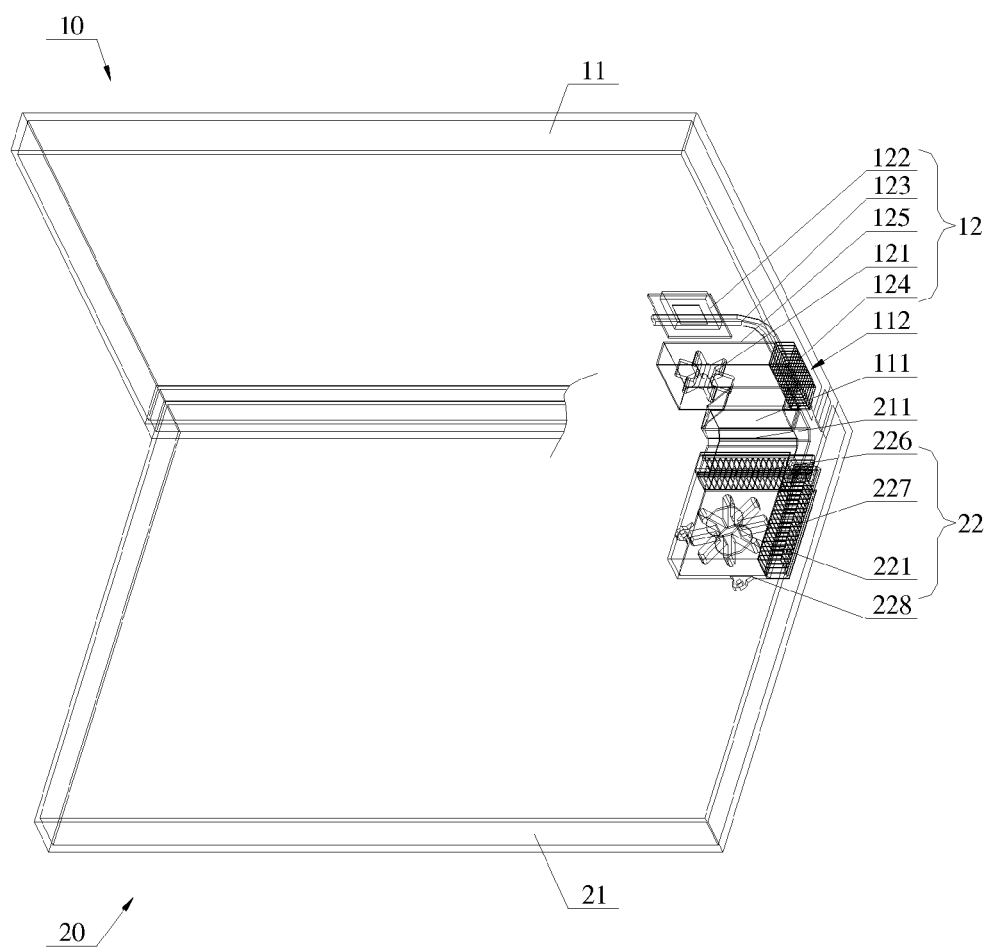
FIG. 1 is a schematic diagram of an overall structure of a notebook computer according to an embodiment.

tablet computer 10, first case 11, first air inlet 111, first air outlet 112, first radiator 12, first fan 121, heat conducting plate 122, first heat pipe 123, first heat dissipation fin 124, heat pipe radiator case 125, first detection unit 13, processing unit 14 and second detection unit 15;

base 20, second case 21, second air outlet 211, second radiator 22, second fan 221, cold surface 222, hot surface 223, first pipe 224, second pipe 225, first fin 226, second fin 227 and semiconductor radiator case 228.

DETAILED DESCRIPTION OF THE INVENTION

According to an electronic device in which a first electronic device is removably connected with a second electronic device, an optimizing design is provided according to the invention to effectively improve the heat dissipation performance of the electronic device.

Generally, the embodiment is described by taking a notebook computer having two use states as an example.

The First Embodiment

FIG. 1 illustrates a schematic diagram of an overall structure of a notebook computer according to the embodiment.

The notebook computer consists of a tablet computer 10 used as a first electronic device and a base 20 used as a second electronic device. The tablet computer 10 is removably connected with the base 20 to achieve the switching between the two use states. FIG. 1 illustrates a use state of a conventional notebook computer after the tablet computer 10 and base 20 are connected, and the other use state is a use state in which a touch screen is used to input after the tablet computer 10 is removed from the base 20. The processing system of the notebook computer may be set in different ways, for example, the tablet computer 10 and the base 20 may both have the processing system, or only the tablet computer 10 has the processing system.

Figure 2:
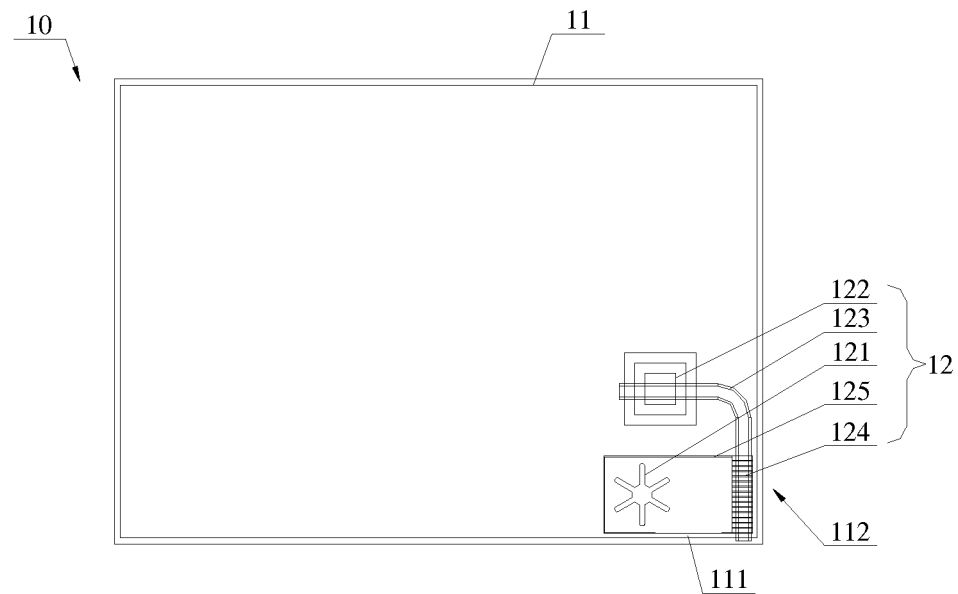
FIG. 2 is a schematic structure diagram of a tablet computer used as a first electronic device according to an embodiment.
Figure 3:
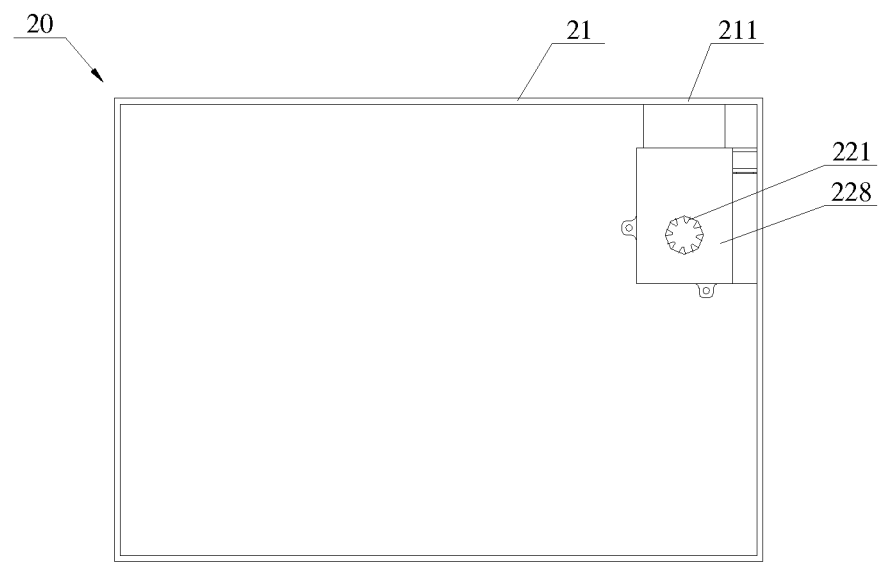
FIG. 3 is a schematic structure diagram of a base used as a second electronic device according to an embodiment.

The following description is mainly based on the technical details of the heat dissipation of the tablet computer 10 and the base 20. FIG. 2 and FIG. 3 are referred to, where FIG. 2 is a schematic structure diagram of the tablet computer used as the first electronic device according to the embodiment, and FIG. 3 is a schematic structure diagram of the base used as the second electronic device according to the embodiment.

As shown in the figures, a first heat dissipation channel is provided in the tablet computer 10. In the disconnected state shown in FIG. 2, the heat dissipation airflow carries the operation heat of the interior heating element out of the tablet computer 10. A second heat dissipation channel is provided in the base 20, and in the connected state shown in FIG. 1, a second air outlet of the second heat dissipation channel communicates with a first air inlet of the first heat dissipation channel, and the heat dissipation airflow may enter into the first heat dissipation channel through the second heat dissipation channel, therefore the heat dissipation of the first electronic device is performed by the second heat dissipation channel and the first heat dissipation channel. For the solution that the processing system is only provided on the tablet computer 10, that is, there is no main heating element in the base 20, the second heat dissipation channel is mainly used to supply the heat dissipation airflow to the first heat dissipation channel in order to perform heat dissipation of the tablet computer 10 under the connected state, therefore the heat dissipation effect of the tablet computer 10 is improved. If a functional element such as a CD driver or a battery is provided in the base 20, the second heat dissipation channel may be used for the necessary heat dissipation of the operation heat of the tablet computer 10 and the base 20, or the second heat dissipation channel may only provide the heat dissipation airflow for the operation heat of the tablet computer 10.

Furthermore, since part of the dissipation function of the tablet computer 10 may be undertaken by the second heat dissipation channel, the heat dissipation capacity of the first heat dissipation channel may be set to be lower than the heating amount in the maximum power consumption state, for the tablet computer 10 which has the same heating amount in the maximum power consumption state. Therefore, the dissipation parameter of the first heat dissipation channel provided in the tablet computer 10 may be lowered and the occupied space of the first heat dissipation channel is decreased, and thus the design of the tablet computer 10 can meet the requirements for lightweight and thinning design.

Particularly, the first heat dissipation channel is formed with the first air inlet 111 on the first case 11 of the tablet computer 10 as the upstream end, and the first air inlet 111 is provided on the side of the first case 11 connecting with the base 20. The second heat dissipation channel is formed with the second air outlet 211 on the second case 21 of the base 20 as the downstream end, and the second air outlet 211 is provided on the side of the second case 21 connecting with the tablet computer 10. In a case that the first interface of the tablet computer 10 is connected with the second interface of the base 20, the first air inlet 111 communicates with the second air outlet 211.

In this solution, in a case that the heat dissipation of the tablet computer 10 is performed, the heat dissipation airflow may be formed through both the first heat dissipation channel and the second heat dissipation channel in order to carry the operation heat of the tablet computer 10 out of the tablet computer 10. In a case that the heat dissipation of both the tablet computer 10 and the base 20 is performed, the heat dissipation airflow formed through the second head dissipation channel, besides carrying the operation heat of the tablet computer 10 out of the tablet computer 10, may also carry the operation heat of the base 20 out of the base 20. The particular implementation may be different according to the power consumption of the device. For example, the heat dissipation channel only has a basic airflow path formed according to temperature difference, and the heat dissipation airflow is formed in a passive and uncontrollable manner, i.e., a heat pipe radiator is provided in the heat dissipation channel or no radiator is provided in the heat dissipation channel. Alternatively, a radiator with a fan or a refrigerating radiator may be provided in the heat dissipation channel, and the heat dissipation airflow is formed in an active and controllable manner.

Based on the control manner, there are four solutions for the first heat dissipation channel and the second heat dissipation channel, as shown in the following table:

|  | solution 1 | solution 2 | solution 3 | solution 4 |
| --- | --- | --- | --- | --- |
| the first heat dissipation channel | active and controllable | active and controllable | passive and uncontrollable | passive and uncontrollable |
| the second heat dissipation channel | active and controllable | passive and uncontrollable | active and controllable | passive and uncontrollable |

Apparently, the solution 1 has a best heat dissipation performance compared with the other three solutions (solution 2, solution 3 and solution 4) since both two heat dissipation channels in the solution 1 form the heat dissipation airflow in the active and controllable manner. Specifically, a first radiator 12 may be provided in the first heat dissipation channel, and a second radiator 22 may be provided in the second heat dissipation channel, in order to improve the heat conducting efficiency between the corresponding heating element in the main body and the heat dissipation airflow in the first heat dissipation channel and/or the second heat dissipation channel. It should be noted that the above two radiators may be selected according to actual needs. For example, the radiator may be a heat pipe radiator, a semiconductor radiator or an independent fan, as long as the functional requirement for improving the heat exchange efficiency is met.

As described above, if the tablet computer 10 is connected with the base 20, the second heat dissipation channel in the base 20 and the first heat dissipation channel function together in the heat dissipation process of the tablet computer 10. Particularly, the second radiator 22 in the second heat dissipation channel may cause the second heat dissipation channel to output a heat dissipation airflow with the heat dissipation parameter of the first air inlet improved, that is to say, the second radiator 22 may facilitate to optimize the heat dissipation parameter of the heat dissipation airflow outputted from the second heat dissipation channel to the first air inlet.

Preferably, the second radiator 22 causes the second heat dissipation channel to output a heat dissipation airflow with the temperature of the first air inlet decreased or with the air flow speed of the first air inlet increased. The second radiator 22 may also cause the second heat dissipation channel to output a heat dissipation airflow with the temperature of the first air inlet decreased and with the air flow speed of the first air inlet increased. The solutions, as long as meeting the functional requirement of effectively improving the heat dissipation parameter of the heat dissipation airflow, are all within the protective scope of the application.

The removable connection between the tablet computer 10 and the base 20 is achieved by a first interface (not shown in the figures) on the first case 11 and a second interface (not shown in the figures) on the second case 12. The first interface and the second interface matching to each other may have different structures, as long as the removable connection can be achieved. For the development trend of lightweight and thinning design, further optimization may be made on the basis of the above structure. Particularly, the first air inlet of the first case 11 may be integrated into the first interface; correspondingly, the second air outlet of the second case 21 may be integrated into the second interface. For example, the first air inlet and the second air outlet for building the heat dissipation airflow path, with a hooking manner as the interface mating manner, may be integrated into corresponding interfaces, this structure is compact and does not need to occupy the space in the width direction of the computer, and thus the requirement for lightweight and thinning design is met.

Furthermore, cables for supplying power and transmitting control signals between the tablet computer 10 and the base 20 may be provided in the matched first interface and second interface. It will be understood that the above cables may not be provided between the tablet computer 10 and the base 20, i.e., the power may be supplied separately by the tablet computer 10 and the base 20 themselves and the control signals may be wirelessly transmitted.

In the solution, the tablet computer 10 may be switched between different power consumption states as needed. A first detection unit 13 of the tablet computer 10 detects the connection state between the tablet computer 10 and the base 20, and outputs an acquired signal about the connection state to a processing unit 14 of the tablet computer 10. The processing unit 14 generates a switching instruction according to the connection state so as to switch the tablet computer 10 from a first operation state (a disconnected state) to a second operation state (a connected state). The tablet computer 10 in the first operation state may operate in a first power consumption state, and the tablet computer 10 in the second operation state may operate in a second power consumption state. The second power consumption is greater than the first power consumption. That is, the tablet computer 10 in the first operation state may operate at a low power consumption; the heat dissipation function of the tablet computer 10 in the second operation state may be achieved by both the second heat dissipation channel and the first heat dissipation channel and the tablet computer 10 may operate at a high power consumption. The second power consumption is a ceiling limit value of the power consumption in the second operation state, and the first power consumption is a ceiling limit value of the power consumption in the first operation state.

The tablet computer 10 in the second power consumption state may perform a corresponding heat dissipation strategy automatically. A second detection unit 15 of the tablet computer 10 detects the high power consumption parameter of the tablet computer 10 and transmits the acquired signal about the high power consumption parameter to the processing unit 14. The processing unit 14 generates a second heat dissipation instruction according to the high power consumption parameter to start the second radiator in the second heat dissipation channel. Apparently, the second radiator should be an active and controllable heat dissipation device, for example, the second radiator may be a controllable fan or a controllable refrigerating radiator, so the heat dissipation effect of the tablet computer 10 is further improved and the tablet computer 10 can reliably operate in the second power consumption state in security.

In order to effectively control the cost of the heat dissipation, the second radiator 22 may be started by controlling the second fan 221 of the second radiator 22. The first fan 121 of the first radiator 12 may be selectively started at the same time according to the current power consumption, in order to maximumly improve the heat dissipation performance in the high power consumption state.

It should be understood that, the standard for determining the second power consumption state is different according to the model of the device, and the principle for determining the second power consumption state may also be different according to the control strategy. For example, whether the tablet computer operates in the second power consumption state may be determined according to the operation state of the interior heating elements such as the double-core processor or the graphics card or according to the high power consumption parameters such as the interior temperature detection result, and a corresponding heat dissipation strategy is selected according to the result of the determination. For another example, if the tablet computer 10 operates at a low power consumption, it is not necessary to start the first radiator 12 and the second radiator 22, i.e., the heat dissipation airflow formed by the natural temperature difference can meet the requirement; and if the tablet computer 10 operates at a middle power consumption, starting only the first fan 121 of the first radiator 12 can meet the requirement.

As described above, the structure of the first radiator 12 may be different from the structure of the second radiator 22. Considering the two designing requirements of manufacturing cost and heat dissipation performance, the first radiator 12 is preferably a heat pipe radiator for saving the manufacturing cost, and the second radiator 22 is preferably a semiconductor radiator for improving the heat dissipation performance. The first radiator 12 and the second radiator 22 may be other radiators, and of course may respectively be a first heat pipe radiator and a second semiconductor radiator.

Referring to FIG. 1 and FIG. 2, the heat pipe radiator includes: a heat conducting plate 122 whose bottom surface is connected with the top surface of an interior heating element, a first heat pipe 123, a first heat dissipation fin 124 and a first fan 121 arranged oppositely to the first heat dissipation fin 124. The evaporation end of the first heat pipe 123 is connected with the heat conducting plate 122, and the condensation end of the first heat pipe 123 is connected with the first heat dissipation fin 124. During the operation, the operation heat of the interior heating element is transferred to the first heat dissipation fin 124 via the first heat pipe 123, and is subject to heat exchange with the first heat dissipation fin 124 by the heat dissipation airflow formed after starting the first fan 121, and then is transferred out of the device.

A first air outlet at the downstream end of the first heat dissipation channel is provided on the first case 11, and the first air outlet 112 may be provided at one or more locations. Preferably, the first air outlet 112 is provided on the first case 11 beside the first heat dissipation fin 124. A second air inlet (not shown in the figures) at the upstream end of the second heat dissipation channel is provided on the second case 21, and similarly, the second air inlet may be provided at one or more locations.

As well known, the heat area of the tablet computer 10 is centralized at the location of the heating elements. The first heat dissipation fin 124 and the first fan 121 may be covered by a heat pipe radiator case 125. The air inlet of the heat pipe radiator case 125 communicates with the first air inlet 111 of the first case 11, and the air outlet of the heat pipe radiator case 125 communicates with the first air outlet 112 of the first case 11. Therefore, good guiding for the heat dissipation airflow is established to improve the heat dissipation effect.

Figure 5:
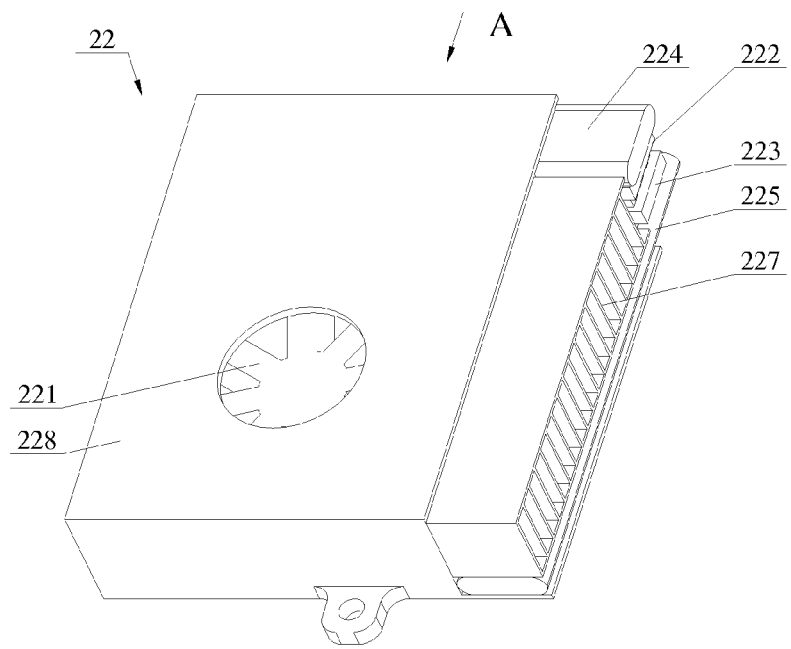
FIG. 5 is a schematic diagram of an overall structure of a semiconductor radiator according to an embodiment.
Figure 6:
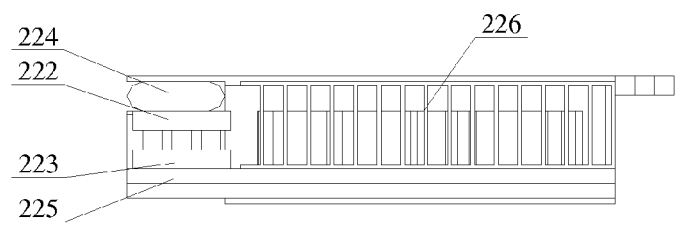
FIG. 6 is a view of FIG. 5 in direction A.
Figure 7:
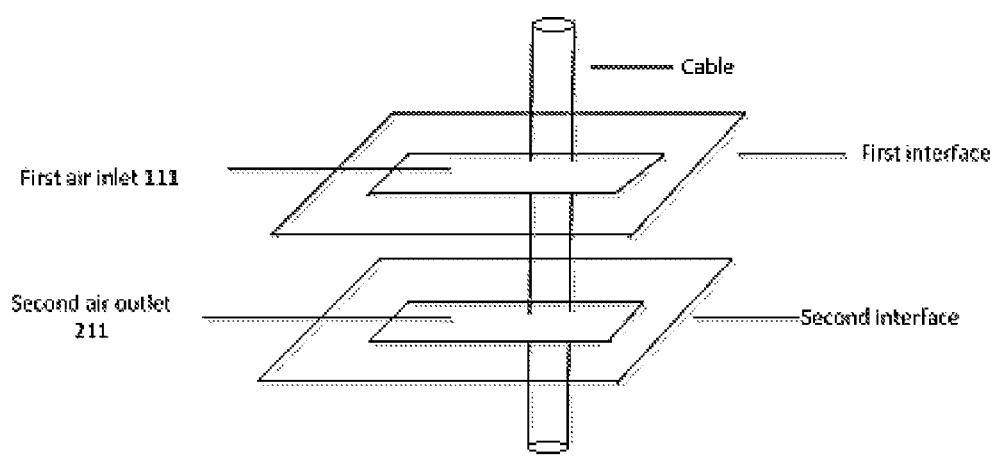
FIG. 7 is a schematic diagram a cable provided between a first interface and second interface according to an embodiment.

Please refer to FIG. 1, FIG. 3, FIG. 5 and FIG. 6, where FIG. 5 is a schematic diagram of an overall structure of a semiconductor radiator according to the embodiment, and FIG. 6 is a view of FIG. 5 in direction A.

The semiconductor refrigerator has a cold surface 222, a hot surface 223 and a refrigerating element (not shown in the figures) between the cold surface 222 and the hot surface 223. Two second heat pipes are respectively the first pipe 224 and the second pipe 225, where the condensation end of the first pipe 224 is connected with the cold surface 222 of the semiconductor refrigerator, the evaporation end of the second pipe 225 is connected with the hot surface 223 of the semiconductor refrigerator, and the through flow directions of the first pipe 224 and the second pipe 225 are interlaced in the projection plane parallel to the cold surface 222 and the hot surface 223. Two second heat dissipation fins are respectively the first fin 226 and the second fin 227 and are arranged correspondingly to the first pipe 224 and the second pipe 225 respectively, the first fin 226 is connected with the evaporation end of the first pipe 224, the second fin 227 is connected with the condensation end of the second pipe 225, and the second fan 221 of the radiator is arranged oppositely to the two second heat dissipation fins to form corresponding heat dissipation airflows. During the operation, the refrigerating element (refrigerating core) refrigerates under electric drive, and the cold surface 222 and the hot surface 223 are formed correspondingly. Low temperature is transferred to the first fin 226 via the first pipe 224, and high temperature is transferred to the second fin 227 via the second pipe 225. The surface temperature of the first fin 226 is lower than the environmental temperature, and thus the temperature of the heat dissipation airflow flowing through the first fin 226 is lower than the environmental temperature, then the heat dissipation airflow enters into the first air inlet 111 of the first heat dissipation channel via the second air outlet 211 of the second heat dissipation channel, and therefore the basic temperature of the heat dissipation airflow of the first air inlet 111 may be decreased.

Similarly, in order to establish good guiding for the heat dissipation airflow to improve the heat dissipation effect, the two second pipes, the two second heat dissipation fins and the second fan of the semiconductor radiator may be covered by a semiconductor radiator case 228, and an air inlet and two air outlets may be provided at the top plate of the semiconductor radiator case 228. The second fan 221 is provided at the air inlet, the first fin 226 and second fin 227 are respectively provided at the two air outlets, and an air outlet on the semiconductor radiator case 228 corresponding to the first fin 226 communicates with the second air outlet 211 of the second case 21, delivering the heat dissipation airflow with a temperature lower than the environmental temperature to the first heat dissipation channel of the tablet computer 10.

The Second Embodiment

Referring to FIG. 1 and FIG. 2, a tablet computer 10 is further provided according to the embodiment.

The tablet computer 10 may be removably connected with a base 20 to be switch between two use states. In a similar way, except elements having the heat dissipation function, other interior functional element of the tablet computer 10 may be implemented using the existing technology. Particularly, a first heat dissipation channel is provided in the tablet computer 10 to form a heat dissipation airflow to deliver the operation heat of the interior heating element out of the tablet computer 10. The first heat dissipation channel is formed with the first air inlet 111 on the first case 11 of the tablet computer 10 as the upstream end, the first air inlet 111 is provided on the side of the first case 11 connecting the first base 20, such that the first air inlet 111 communicates with the second air outlet of the second dissipation channel of the base 20.

In this configuration, the first heat dissipation channel has an independent and complete heat dissipation function if the tablet computer 10 is used separately. In a cast that the tablet computer 10 and the base 20 are assembled together, the first heat dissipation channel communicates with the second dissipation channel to perform heat dissipation of the tablet computer 10. Therefore, the heat dissipation capacity of the first heat dissipation channel may be set to be lower than the heating amount in the maximum power consumption state, and the heat dissipation parameter of the first heat dissipation channel of the first electronic device may be effectively controlled, therefore the occupied space of the first heat dissipation channel is greatly reduced.

In order to further improve the heat dissipation performance, the second heat dissipation channel communicating with the first air inlet 111 may output a heat dissipation airflow with the heat dissipation parameter improved. A first radiator 12 may be provided in the first heat dissipation channel to improve the heat dissipation performance of the first heat dissipation channel. Similarly, the radiator may be selected according to actual need, for example, the radiator may be a heat pipe radiator, a semiconductor radiator or an independent fan, as long as the functional requirement for improving the heat exchange efficiency is met.

Preferably, the first radiator 12 in the embodiment is a heat pipe radiator for saving the manufacturing cost. Referring to FIG. 1 and FIG. 2, the heat pipe radiator includes: a heat conducting plate 122 whose bottom surface is connected with the top surface of the interior heating element, a first heat pipe 123, a first heat dissipation fin 124 and a first fan 121 arranged oppositely to the first heat generating fin 124. The evaporation end of the first heat pipe 123 is connected with the heat conducting plate 122, and the condensation end of the first heat pipe 123 is connected with the first heat dissipation fin 124. During the operation, the operation heat of the interior heating element is transferred to the first heat dissipation fin 124 via the first heat pipe 123, and is subject to heat exchange with the first heat dissipation fin 124 through the heat dissipation airflow formed after starting the first fan 121, then is transferred out of the device.

A first air outlet at the downstream end of the first heat dissipation channel is provided on the first case 11. The first air outlet 112 may be provided at one or more locations. Preferably, the first air outlet 112 is provided on the first case 11 beside the first heat dissipation fin 124. A second air inlet (not shown in the figures) at the upstream end of the second heat dissipation channel is provided on the second case 21, and similarly, the second air inlet may be provided at one or more locations.

As well known, the interior heat area of the tablet computer 10 is centralized at the location of the heating elements. The first heat dissipation fin 124 and the first fan 121 may be covered by a heat pipe radiator case 125, the air inlet of the heat pipe radiator case 125 communicates with the first air inlet 111 of the first case 11, and the air outlet of the heat pipe radiator case 125 communicates with the first air outlet 112 of the first case 11. Therefore, good guiding for the heat dissipation airflow is established to improve the heat dissipation effect.

Furthermore, a first interface (not shown in the figures) adapted to achieve the removable connection between the tablet computer 10 and the base 20 may be selected according to the actual structure, as long as the removable connection can be achieved. For the development trend of lightweight and thinning design, further optimization may be made on the basis of the aforementioned structure. The first air inlet on the first case 11 may be integrated into the first interface. For example, the first air inlet for building the heat dissipation airflow path, with a hooking manner as the interface mating manner, may be integrated into the corresponding interface, and thus the structure is compact.

The tablet computer 10 according to the embodiment may be switched between different power consumption states as required. The first detection unit 13 of the tablet computer 10 is used to detect the connection state between the tablet computer 10 and the base 20, and sends an acquired signal about the connection state to the processing unit 14 of the tablet computer 10. The processing unit 14 is used to generate a switching instruction according to the connection state, to switch the tablet computer 10 from a first operation state (a disconnected state) to a second operation state (a connected state). The tablet computer 10 in the first operation state may operate in a first power consumption state, and the tablet computer 10 in the second operation state may operate in a second power consumption state. The second power consumption is greater than the first power consumption. That is, the tablet computer 10 in the first operation state may operate at a low power consumption; the heat dissipation function of the tablet computer 10 in the second operation state may be achieved by both the second heat dissipation channel and the first heat dissipation channel and the tablet computer 10 may operate at a high power consumption. The second power consumption is a ceiling limit value of the power consumption in the second operation state, and the first power consumption is a ceiling limit value of the power consumption in the first operation state.

The tablet computer 10 in the second power consumption state may perform a corresponding heat dissipation strategy automatically. The second detection unit 15 of the tablet computer 10 is adapted to detect the high power consumption parameter of the tablet computer 10 and send an acquired signal about the high power consumption parameter to the processing unit 14. The processing unit 14 generates a second heat dissipation instruction according to the high power consumption parameter so as to start the second radiator in the second heat dissipation channel. Therefore, the heat dissipation effect of the tablet computer 10 is improved and the tablet computer 10 can reliably operate in the second power consumption state in security.

It should be understood that the standard for determining the second power consumption state is different according to the model of the device, and the principle for determining the second power consumption state may also be different according to the control strategy. For example, whether the tablet computer operates in the second power consumption state may be determined according to the operation state of the interior heating elements such as the double-core processor or the graphics card or according to the high power consumption parameters such as the interior temperature detection result, and a corresponding heat dissipation strategy is selected according to the result of the determination. For another example, if the tablet computer 10 operates at a low power consumption, it is not necessary to start the first radiator 12 and the second radiator 22, i.e., the heat dissipation airflow formed by the natural temperature difference can meet the requirement; and if the tablet computer 10 operates at a middle power consumption, starting only the first fan 121 of the first radiator 12 can meet the requirement.

The Third Embodiment

Referring to FIG. 1 and FIG. 3, a base 20 is further provided according to the embodiment.

The base 20 may be removably connected with the tablet computer 10 so as to switch the tablet computer between two use states. Similarly, the base 20 may be provided with a processing system. For example, only the tablet computer 10 is provided with a processing system, i.e., the base 20 itself has no processing ability and only provides functions such as heat dissipation and/or Input/Output extension and/or additional power supply. It is also possible that each of the tablet computer 10 and the base 20 has a processing system, and in a connected state, the two processing system may operate according to actual matching.

Particularly, a second heat dissipation channel is provided in the base 20 to form an airflow to carry the operation heat of the interior heating elements out of the base. The second heat dissipation channel is formed with the second air outlet 211 on the second case 21 of the base 20 as the downstream end. The second air outlet 211 is provided on the side of the second case 21 connecting with the tablet computer 10, such that the second air outlet 211 communicates with the first air inlet 111 of the tablet computer 10, and the heat dissipation airflow is supplied to the tablet computer 10.

For further improving the heat dissipation performance, a second radiator 22 may be provided in the second heat dissipation channel, so as to improve the heat dissipation performance of the second heat dissipation channel itself and/or the tablet computer 10. Particularly, the second radiator 22 in the second heat dissipation channel may cause the second heat dissipation channel to output a heat dissipation airflow with the heat dissipation parameter of the first air inlet improved, that is, the second radiator 22 may optimize the heat dissipation parameter of the heat dissipation airflow outputted to the first air inlet via the second heat dissipation channel. It should be understood that the radiator may be selected according to actual need. For example, the radiator may be a semiconductor radiator or an independent fan, as long as the functional requirement for improving heat exchange efficiency can be met.

Preferably, the second radiator 22 is adapted to cause the second heat dissipation channel to output a heat dissipation airflow with the temperature of the first air inlet decreased or with the air flow speed of the first air inlet increased. The second radiator 22 may also be adapted to cause the second heat dissipation channel to output a heat dissipation airflow with the temperature of the first air inlet decreased and with the air flow speed of the first air inlet increased. The solutions, as long as meeting the functional requirement of effectively improving the heat dissipation parameter of the heat dissipation airflow, are all within the protective scope of the application.

Preferably, the second radiator 22 in the embodiment is a semiconductor radiator for improving the heat dissipation performance. Please refer to FIG. 5 and FIG. 6.

The semiconductor refrigerator includes: a cold surface 222, a hot surface 223 and a refrigerating element (not shown in the figures) between the cold surface 222 and the hot surface 223. Two second heat pipes are respectively a first pipe 224 and a second pipe 225, where the condensation end of the first pipe 224 is connected with the cold surface 222 of the semiconductor refrigerator, the evaporation end of the second pipe 225 is connected with the hot surface 223 of the semiconductor refrigerator, and the through flow directions of the first pipe 224 and the second pipe 225 are interlaced in the projection plane parallel to the cold surface 222 and the hot surface 223. Two second heat dissipation fins are respectively a first fin 226 and a second fin 227 and are arranged correspondingly to the first pipe 224 and the second pipe 225 respectively, the first fin 226 is connected with the evaporation end of the first pipe 224, the second fin 227 is connected with the condensation end of the second pipe 225, and the second fan 221 of the radiator is arranged oppositely to the two second heat dissipation fins to form corresponding heat dissipation airflows. During the operation, the refrigerating element (refrigerating core) refrigerates under electric drive, and the cold surface 222 and the hot surface 223 are formed correspondingly. Low temperature is transferred to the first fin 226 via the first pipe 224, and high temperature is transferred to second fin 227 via the second pipe 225. The surface temperature of the first fin 226 is lower than the environmental temperature, and thus the temperature of the heat dissipation airflow flowing through the first fin 226 is lower than the environmental temperature, then the heat dissipation airflow enters into the first air inlet 111 of the first heat dissipation channel via the second air outlet 211 of the second heat dissipation channel, and therefore the basic temperature of the heat dissipation airflow of the first air inlet 111 may be decreased.

Similarly, for establishing good guiding for the heat dissipation airflow to improve the heat dissipation effect, the two second pipes, the two second heat dissipation fins and the second fan of the semiconductor refrigerator may be covered by a semiconductor radiator case 228, and an air inlet and two air outlets are provided at the top plate of the semiconductor radiator case 228. The second fan 221 is provided at the air inlet, the first fin 226 and the second fin 227 are respectively provided at the two air outlets, and an air outlet on the semiconductor radiator case 228 corresponding to the first fin 226 communicates with the second air outlet 211 of the second case 21, and thus the heat dissipation flow with a temperature lower than the environmental temperature is delivered to the first heat dissipation channel of the tablet computer 10.

The starting of the aforementioned controllable second radiator 22 (a refrigerating radiator or a fan) is controlled by the processing unit 14 according to the current power consumption state. Particularly, in the second power consumption state, the second radiator 22 in the second heat dissipation channel starts by receiving a second heat dissipation instruction, and thus the heat dissipation effect of the tablet computer 10 is improved. The second heat dissipation instruction is generated by the processing unit 14 based on the high power consumption parameter, so that the tablet computer 10 can reliably operate in the second power consumption state in security. Similarly, the standard for determining the second power consumption state is different according to the model of the device, and the principle for determining the second power consumption may be different according to the control strategy.

In a cast that the amount of the operation heat in the base 20 is great, the second radiator 22 may also perform heat dissipation of the base 20 itself. However, even if the amount of the operation heat in the base 20 is great, the second radiator 22 may only perform heat dissipation of the matched tablet computer 10.

The Fourth Embodiment

Figure 4:
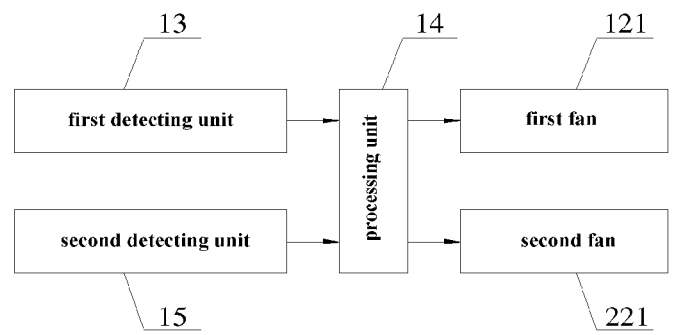
FIG. 4 illustrates an operation block diagram of a method for switching use state of the tablet computer according to an embodiment.

Besides the aforementioned notebook computer with the two use states, a method for switching use states of a tablet computer is provided according to the embodiment. FIG. 4 illustrates an operation block diagram of the method for switching the use state of the tablet computer according to the embodiment.

The method for switching the use state of the tablet computer includes the following steps S41 to S45.

S41, detecting whether the tablet computer is connected with the base 20 and acquiring a detection result.

S42, generating a switching instruction if the detection result indicates that the tablet computer 10 is connected with the base 20.

S43, switching the tablet computer 10 from the first operation state to the second operation state according to the switching instruction.

The tablet computer 10 in the first operation state may operate in the first power consumption state, the tablet computer 10 in the second operation state may operate in the second power consumption state, and the second power consumption is greater than the first power consumption.

On this basis, the method for switching the use state may further include the step of adjusting and controlling the heat dissipation parameter.

S44, detecting the high power consumption parameter of the tablet computer 10.

S45, outputting a second heat dissipation instruction if the high power consumption parameter reaches a preset threshold, so as to start the second radiator 22 in the second heat dissipation channel. According to the high power consumption parameter related to a particular control strategy, the preset threshold may be defined as follows: the double-core processor operate at the same time, the single-core processor and the graphics card operate at the same time or a ceiling limit value of the interior temperature.

It is to be noted that, the step S44 and the step S45 for adjusting the heat dissipation parameter may be performed based on the tablet computer 10 in the second operation state, that is, no main heating element is provided in the base 20 and the second heat dissipation channel mainly supplies heat dissipation airflow for the tablet computer 10. If a heating element is provided in the base 20, the step of adjusting the heat dissipation parameter by starting the second radiator 22 is not limited to the aforementioned time sequence.

It is to be noted that the technical solution about the heat dissipation of the electronic device according to the invention is applicable to the aforementioned notebook computer with two use states, and also applicable to any electronic products in which a first electronic device is removably connected with a second electronic device.

All of the above mentioned are preferable embodiments of the invention, and do not limit the protection scope of the invention. Any modification, equivalent alternation and improvement made within the spirit and principle of the invention falls within the protection scope of the claims of the invention.

The invention claimed is:

1. A first electronic device, comprising:
a first case, on which a first interface is provided, the first interface is adapted to removably connected with a second interface of a second electronic device; and
a processing unit provided in the first case,
wherein a first air inlet is provided on a side of the first case connecting with the second electronic device, and a first heat dissipation channel of the first electronic device is formed with the first air inlet as an upstream end, and
in a case that the first interface is connected with the second interface, the first air inlet communicates with a second air outlet of a second heat dissipation channel of the second electronic device;
wherein the first air inlet of the first case is integrated into the first interface, and wherein cables for supplying power and transmitting control signals between the first electronic device and the second electronic device are provided in the matched first interface and the second interface.

2. The first electronic device according to claim 1, wherein the second heat dissipation channel outputs a heat dissipation airflow with a heat dissipation parameter of the first air inlet improved.

3. The first electronic device according to claim 1, wherein a first radiator is provided in the first heat dissipation channel.

4. The first electronic device according to claim 3, wherein the first radiator is a heat pipe radiator comprising: a heat conducting plate whose bottom surface is connected with a top surface of an interior heating element, a first heat pipe, a first heat dissipation fin and a first fan arranged oppositely to the first heat dissipation fin, wherein an evaporation end of the first heat pipe is connected with the heat conducting plate, and a condensation end of the first heat pipe is connected with the first heat dissipation fin.

5. The first electronic device according to claim 4, wherein:
a first air outlet at a downstream end of the first heat dissipation channel is provided on the first case;
the first radiator further comprises a heat pipe radiator case, the first heat dissipation fin and the first fan are arranged in the heat pipe radiator case in parallel, an air inlet of the heat pipe radiator case communicates with the first air inlet of the first case, and an air outlet of the heat pipe radiator case communicates with the first air outlet of the first case.

6. The first electronic device according to claim 1, further comprising:
a first detection unit, adapted to detect a connection state between the first electronic device and the second electronic device;
wherein the processing unit is adapted to generate a switching instruction according to the connection state so as to switch the first electronic device from a first operation state to a second operation state;
wherein the first electronic device in the first operation state operates in a state of first power consumption, the first electronic device in the second operation state operates in a state of second power consumption, and the second power consumption is greater than the first power consumption.

7. The first electronic device according to claim 6, further comprising:
a second detection unit, adapted to detect a high power consumption parameter of the first electronic device;
wherein the processing unit is further adapted to generate a second heat dissipation instruction according to the high power consumption parameter so as to start a second radiator in the second heat dissipation channel.

8. A second electronic device, comprising: a second case, on which a second interface is provided, the second interface is adapted to removably connected with a first interface of a first electronic device,
wherein a second air outlet is provided on a side of the second case connecting with the first electronic device, a second heat dissipation channel of the second electronic device is formed with the second air outlet as a downstream end, and
in a case that the second interface is connected with the first interface, the second air outlet communicates with a first air inlet of a first heat dissipation channel of the first electronic device;
wherein the second air outlet of the second case is integrated into the second interface, and wherein cables for supplying power and transmitting control signals between the first electronic device and the second electronic device are provided in the matched first interface and the second interface.

9. The second electronic device according to claim 8, wherein a second radiator is provided in the second heat dissipation channel, and
the second radiator is adapted to cause the second heat dissipation channel to output a heat dissipation airflow with a heat dissipation parameter of the first air inlet improved, or
the second radiator is adapted to cause the second heat dissipation channel to output a heat dissipation airflow with temperature of the first air inlet decreased and/or with flow speed of the first air inlet increased.

10. An electronic device, comprising a second electronic device and a first electronic device removably connected with the second electronic device, wherein the electronic device comprises:
a first heat dissipation channel, provided in the first electronic device; and
a second heat dissipation channel, provided in the second electronic device;
wherein in a case that the first electronic device is not connected with the second electronic device, a heat dissipation airflow passes through the first heat dissipation channel such that heat dissipation of the first electronic device is performed; and in a case that the first electronic device is connected with the second electronic device, a first air inlet of the first heat dissipation channel communicates with a second air outlet of the second heat dissipation channel, a heat dissipation airflow enters into the first heat dissipation channel via the second heat dissipation channel such that heat dissipation of the first electronic device is performed by the second heat dissipation channel and the first heat dissipation channel;
wherein the first air inlet of the first case is integrated into a first interface, and wherein cables for supplying power and transmitting control signals between the first electronic device and the second electronic device are provided in the matched first interface and a second interface.

11. The electronic device according to claim 10, wherein a first radiator is provided in the first heat dissipation channel and/or a second radiator is provided in the second heat dissipation channel.

12. The electronic device according to claim 11, wherein in a case that the second radiator is provided in the second heat dissipation channel,
the second radiator is adapted to cause the second heat dissipation channel to output a heat dissipation airflow with a heat dissipation parameter of the first air inlet improved, or
the second radiator is adapted to cause the second heat dissipation channel to output a heat dissipation airflow with temperature of the first air inlet decreased and/or with flow speed of the first air inlet increased.

13. The electronic device according to claim 12, wherein a processing unit of the first electronic device is adapted to generate a second heat dissipation instruction according to a high power consumption parameter of the first electronic device so as to start a fan of the second radiator.

14. The electronic device according to claim 11, wherein in a case that the first radiator is provided in the first heat dissipation channel,
the first radiator is a heat pipe radiator comprising: a heat conducting plate whose bottom surface is connected with a top surface of an interior heating element, a first heat pipe, a first heat dissipation fin and a first fan arranged oppositely to the first heat dissipation fin, wherein an evaporation end of the first heat pipe is connected with the heat conducting plate, and a condensation end of the first heat pipe is connected with the first heat dissipation fin.

15. The electronic device according to claim 11, wherein in a case that the second radiator is provided in the second heat dissipation channel,
the second radiator is a semiconductor radiator comprising:
a semiconductor refrigerator, which has a cold surface, a hot surface and a refrigerating element disposed between the cold surface and the hot surface;
two second heat pipes, which are respectively a first pipe and a second pipe, where a condensation end of the first pipe is connected with the cold surface of the semiconductor refrigerator, an evaporation end of the second pipe is connected with the hot surface of the semiconductor refrigerator, and through flow directions of the first pipe and the second pipe are interlaced in a projection plane parallel to the cold surface and the hot surface;

two second heat dissipation fins, which are respectively a first fin and a second fin, and are respectively arranged oppositely to the first pipe and the second pipe, wherein the first fin is connected with an evaporation end of the first pipe and the second fin is connected with a condensation end of the second pipe; and a second fan arranged oppositely to the two second heat dissipation fins.

16. The electronic device according to claim 15, further comprising:

a semiconductor radiator case, wherein the two second heat pipes, the two second heat dissipation fins and the second fan of the semiconductor radiator are provided in the semiconductor radiator case, and an air inlet and two air outlets are provided on a top plate of the semiconductor radiator case;

wherein the second fan is provided at the air inlet, the first fin and the second fin are respectively provided at the two air outlets, and the air outlet on the semiconductor radiator case corresponding to the first fin communicates with the second air outlet of the second case.

17. A method for switching use state of a first electronic device, the first electronic device being removably connected with a second electronic device, wherein a first air inlet is provided on a side of the first electronic device connecting with the second electronic device, and a first heat dissipation channel of the first electronic device is formed with the first air inlet as an upstream end, and wherein in a case that a first interface is connected with a second interface, the first air inlet communicates with a second air outlet of a second heat dissipation channel of the second electronic device; the method for switching the use state comprises:

detecting whether the first electronic device is connected with the second electronic device and acquiring a detection result;

generating a switching instruction if the detection result indicates that the first electronic device is connected with the second electronic device; and switching the first electronic device from a first operation state to a second operation state according to the switching instruction, wherein the first electronic device in the first operation state operates in a state of first power consumption, the first electronic device in the second operation state operates in a state of second power consumption, and the second power consumption is greater than the first power consumption;

wherein the first air inlet of the first case is integrated into the first interface, and wherein cables for supplying power and transmitting control signals between the first electronic device and the second electronic device are provided in the matched first interface and the second interface.

18. The method for switching use state of the first electronic device according to claim 17, further comprising: detecting a high power consumption parameter of the first electronic device, and outputting a second heat dissipation instruction if the high power consumption parameter reaches a preset threshold, so as to start a second radiator in the second heat dissipation channel.

* * * * *